(12) United States Patent
Yamanaka et al.

(10) Patent No.: US 11,659,429 B2
(45) Date of Patent: May 23, 2023

(54) PROCESSING APPARATUS, PROCESSED DATA COLLECTION METHOD AND DATA COLLECTION SYSTEM

(71) Applicant: THK CO., LTD., Tokyo (JP)

(72) Inventors: Shuhei Yamanaka, Tokyo (JP); Masatomo Tokuno, Tokyo (JP)

(73) Assignee: THK CO., LTD., Tokyo (JP)

( * ) Notice: Subject to any disclaimer, the term of this patent is extended or adjusted under 35 U.S.C. 154(b) by 36 days.

(21) Appl. No.: 17/604,899

(22) PCT Filed: Apr. 24, 2020

(86) PCT No.: PCT/JP2020/017815
§ 371 (c)(1),
(2) Date: Oct. 19, 2021

(87) PCT Pub. No.: WO2020/218568
PCT Pub. Date: Oct. 29, 2020

(65) Prior Publication Data
US 2022/0201532 A1    Jun. 23, 2022

(30) Foreign Application Priority Data

Apr. 25, 2019  (JP) .............................. JP2019-084328

(51) Int. Cl.
*H04W 28/02*    (2009.01)
*H04W 84/18*    (2009.01)

(52) U.S. Cl.
CPC ..... *H04W 28/021* (2013.01); *H04W 28/0215* (2013.01); *H04W 84/18* (2013.01)

(58) Field of Classification Search
None
See application file for complete search history.

(56) References Cited

U.S. PATENT DOCUMENTS

| 2009/0198806 A1* | 8/2009 | Kim ........................ H04L 41/00 709/222 |
| 2012/0081545 A1* | 4/2012 | Jin ........................ G01B 11/022 348/135 |
| 2017/0137047 A1* | 5/2017 | Kim .................... B61L 15/0027 |

FOREIGN PATENT DOCUMENTS

JP    2015-26925 A    2/2015

OTHER PUBLICATIONS

International Search Report dated Jul. 7, 2020, issued in counterpart International Application No. PCT/JP2020/017815. (2 pages).

* cited by examiner

*Primary Examiner* — Kenny S Lin
(74) *Attorney, Agent, or Firm* — WHDA, LLP

(57) ABSTRACT

The processing apparatus performs predetermined processing for measurement data transmitted from the sensor, in which the processing apparatus acquires transmission destination information indicating a predetermined area in a server apparatus in an outside in which processed data subjected to the predetermined processing is to be stored, from a relay apparatus that performs relay processing between the processing apparatus and the server apparatus in order to transmit the processed data from the processing apparatus to the server apparatus, when the relay apparatus is communicatively connected to the communication unit in a state before building of a network between the processing apparatus and the server apparatus, and generates, after the acquisition of the transmission destination information, transmission-processed data in a form in which the relay apparatus is able to execute the relay processing, by adding information relating to the predetermined area indicated by the transmission destination information to the processed data.

7 Claims, 5 Drawing Sheets

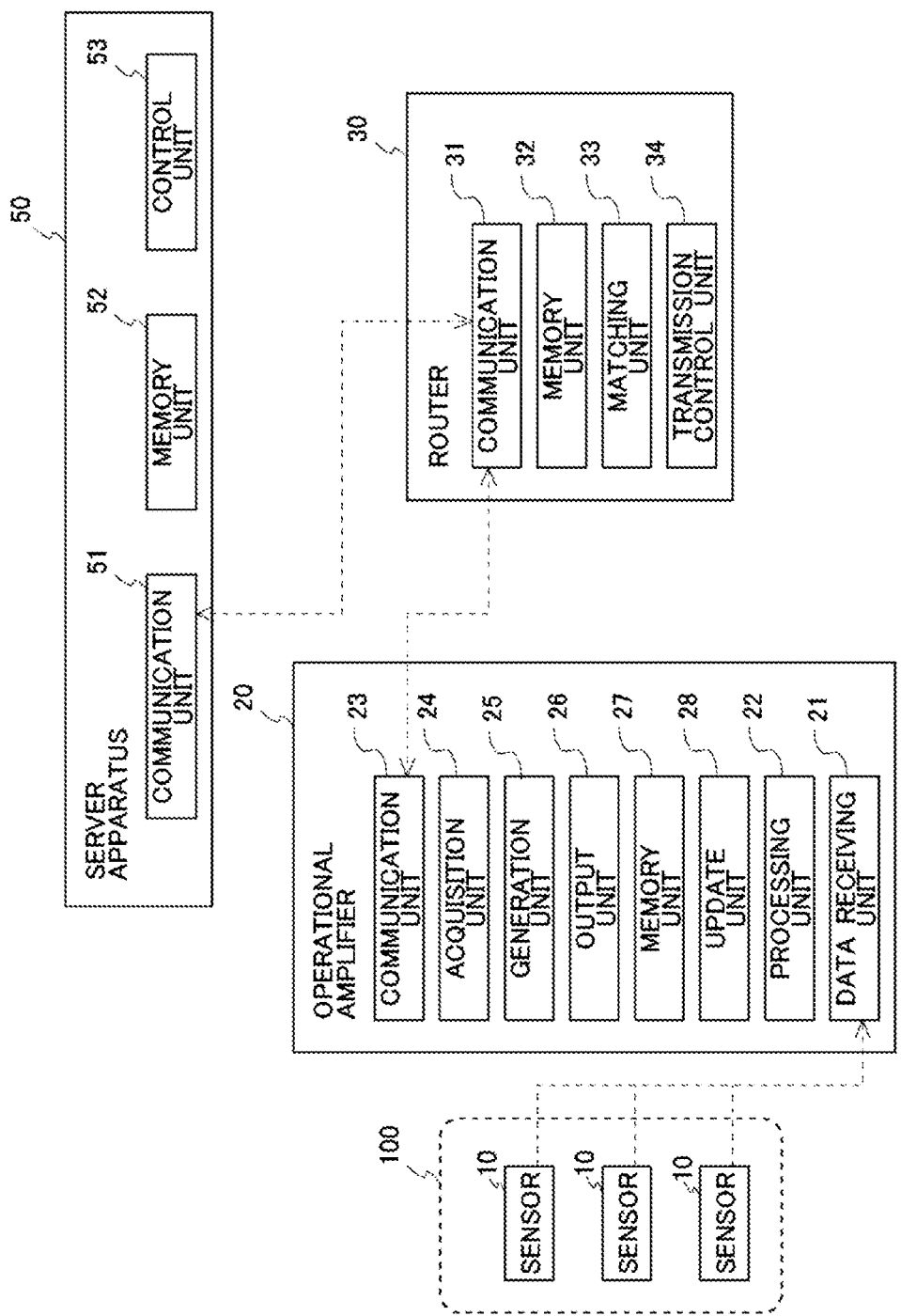

[Fig. 2]

(a) PROCESSED DATA

| SENSOR ID | AMPLIFIER ID | MEASUREMENT TIME AND DATE | SENSOR TYPE | PROCESSED MEASUREMENT VALUES |
|---|---|---|---|---|
| R001 | A001 | 201902x1 | ACCELERATION | a1, a2, a3, a4, a5 |
| R002 | A002 | 201902x2 | ACCELERATION | a11, a12, a13, a14, a15 |
| R003 | A003 | 201902x3 | TEMPERATURE | t1, t2, t3, t4, t5 |

(b) TRANSMISSION-PROCESSED DATA

| SENSOR ID | AMPLIFIER ID | MEASUREMENT TIME AND DATE | SENSOR TYPE | PROCESSED MEASUREMENT VALUES | TRANSMISSION DESTINATION |
|---|---|---|---|---|---|
| R001 | A001 | 201902x1 | ACCELERATION | a1, a2, a3, a4, a5 | DC1R1 |
| R002 | A002 | 201902x2 | ACCELERATION | a11, a12, a13, a14, a15 | DC1R1 |
| R003 | A003 | 201902x3 | TEMPERATURE | t1, t2, t3, t4, t5 | DC1R1 |

[Fig. 3]
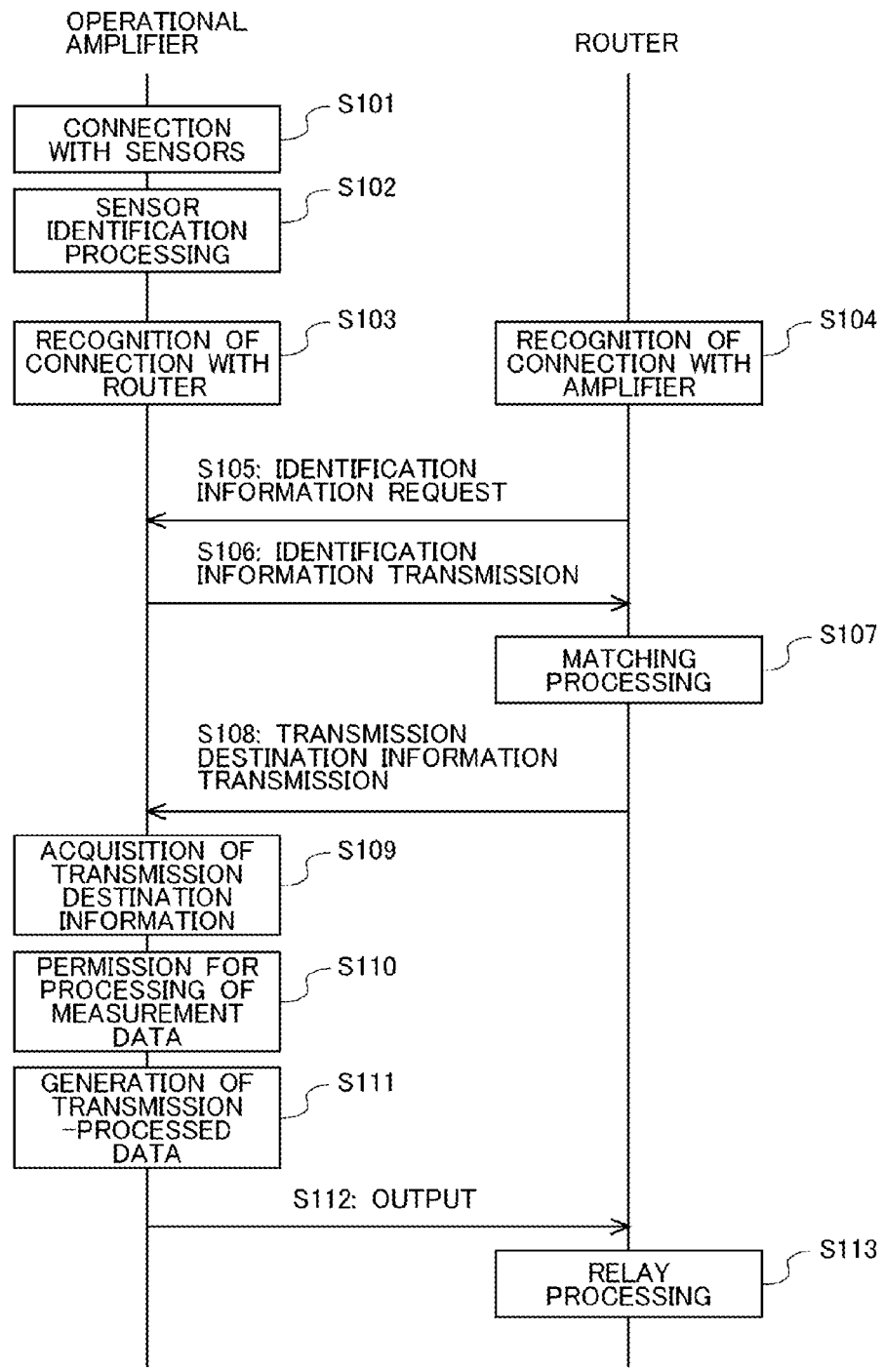

[Fig. 4]
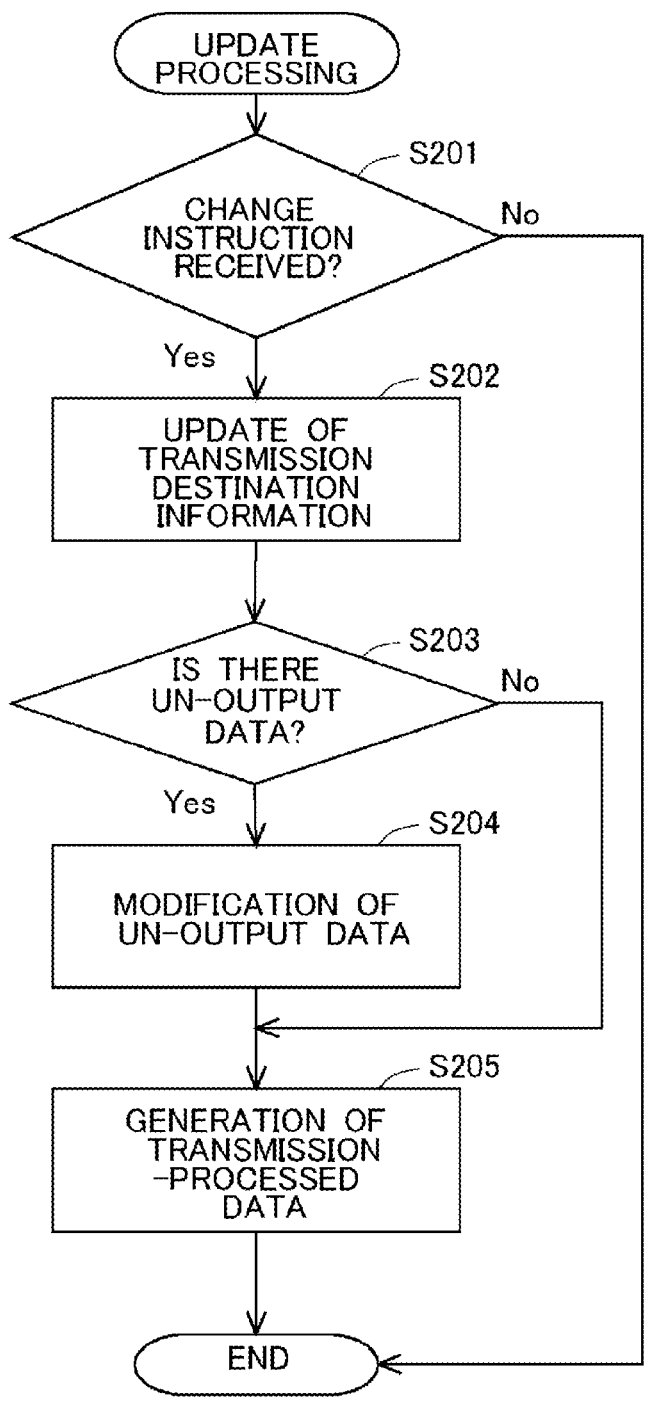

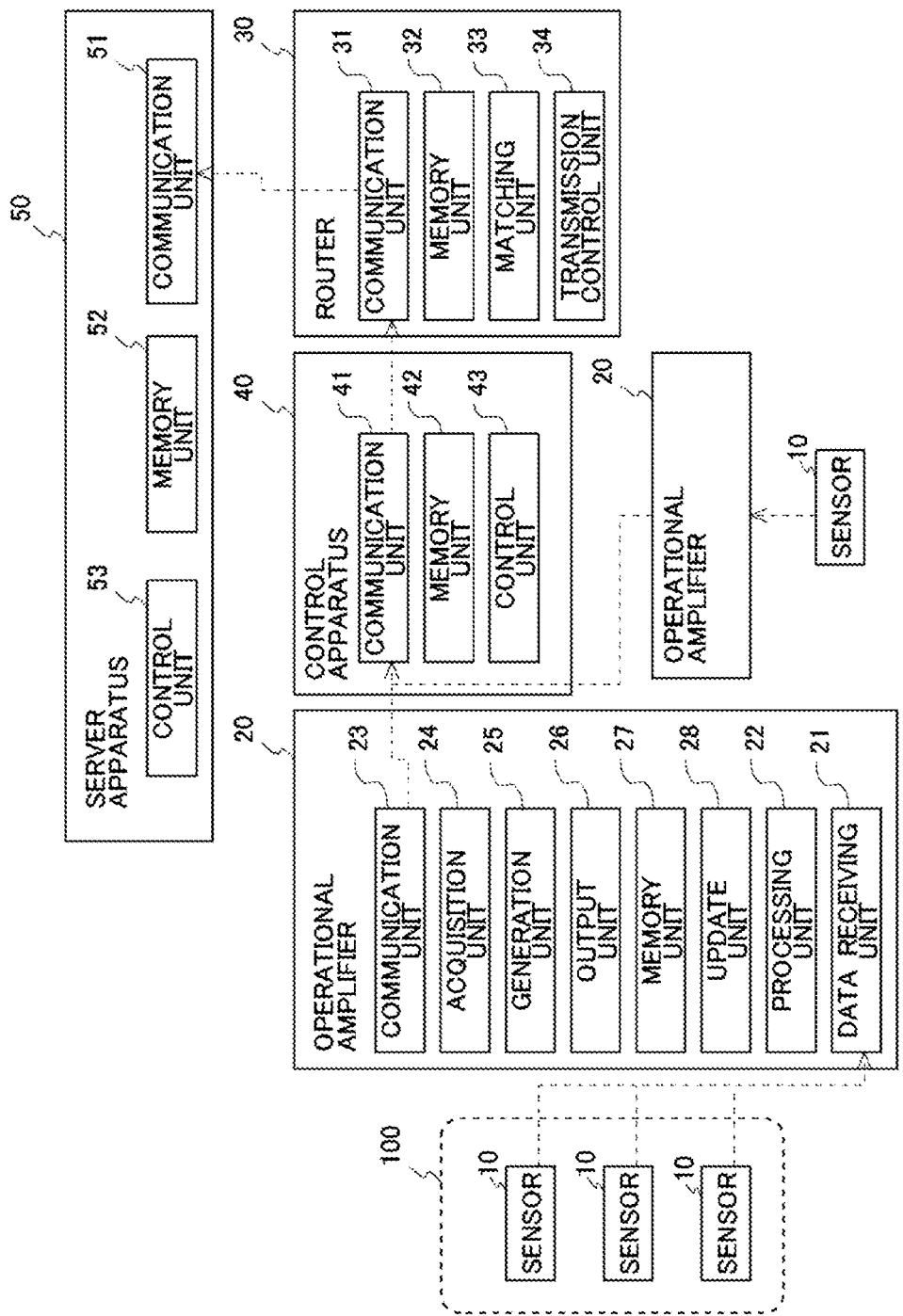

PROCESSING APPARATUS, PROCESSED DATA COLLECTION METHOD AND DATA COLLECTION SYSTEM

TECHNICAL FIELD

The present invention relates to a technique for collecting data obtained by a device such as a sensor.

BACKGROUND ART

A technique called "sensor network" has been studied. This enables collection, management and seamless use of sensing data by installing sensors each having a sensing function and a communication function in various places, mobile bodies, industrial facilities, etc., and networking the sensors. As a technique relating to sensor network, a sensor amplifier that amplifies and processes a signal detected by a sensor and wirelessly transmits the resulting signal to an apparatus in the outside has been known.

Patent document 1 discloses a technique relating to data collection via a cradle apparatus configured to be wirelessly communicative with a plurality of sensors. In the technique, data are transmitted from the sensors to the cradle apparatus and stored in the cradle apparatus. Then, when a mobile terminal is set in the cradle apparatus, the data stored in the cradle apparatus is transmitted to a predetermined server via a network using a communication function of the mobile terminal. This configuration allows data from the sensors to be successively collected to the server.

CITATION LIST

Patent Document

Patent document 1: Japanese Patent Laid-Open No. 2015-26925

SUMMARY OF THE INVENTION

Problems to be Solved by the Invention

Generally, measurement data of measurement by a sensor is subjected to predetermined processing. For example, where an output of the sensor is weak, processing for amplifying the output of the measurement data may be performed in order to prevent the measurement data from being affected by noise during communication. Also, the measurement data itself is data specifically indicating a predetermined physical quantity or the like that is a target of measurement; however, the data as it is very large in volume and imposes a large communication load on a sensor network and wastes a capacity of a memory device provided in the sensor network. Therefore, processing for reducing the volume of the measurement data may be performed.

However, in conventional techniques, no sufficient consideration of building a network for collecting measurement data from sensors to a server apparatus on a network has been made. Therefore, a user needs to take a great amount of effort when building a sensor network. In particular, where there is a demand for high safety for measurement data in building a sensor network, building of the sensor network becomes more difficult.

The present invention has been made in view of the above problems and an object of the present invention is to provide a technique for easily building a sensor network for collecting necessary data from sensors in a favorably manner.

Means for Solving the Problems

In the present invention, in order to solve the above problems, a processing apparatus of the present invention employs a configuration that subjects measurement data from a sensor to predetermined processing, and when the processed data subjected to the predetermined processing is transmitted, generates transmission-processed data understandable for a relay apparatus to perform relay processing, by combining transmission destination information acquired from the relay apparatus and the processed data. This configuration allows easy configuration of a sensor network that enables transmission of processed data to a predetermined transmission destination, with a communicative communication between the processing apparatus and the relay apparatus as a trigger.

In more detail, the present invention provides a processing apparatus connected to a sensor configured to measure a predetermined physical quantity, the processing apparatus performing predetermined processing for measurement data transmitted from the sensor, the processing apparatus including: a communication unit that performs communication between an outside and the processing apparatus; an acquisition unit that acquires transmission destination information indicating a predetermined area in a server apparatus in the outside in which processed data subjected to the predetermined processing is to be stored, from a relay apparatus that performs relay processing between the processing apparatus and the server apparatus in order to transmit the processed data from the processing apparatus to the server apparatus, when the relay apparatus is communicatively connected to the communication unit in a state before building of a network between the processing apparatus and the server apparatus; a generation unit that generates, after the acquisition of the transmission destination information, transmission-processed data in a form in which the relay apparatus is able to execute the relay processing, by adding information relating to the predetermined area indicated by the transmission destination information to the processed data; and an output unit that outputs the transmission-processed data to the relay apparatus.

Effects of the Invention

Easy building of a sensor network for collecting necessary data from sensors in a favorable manner is enabled.

BRIEF DESCRIPTION OF THE DRAWINGS

FIG. 1 is a first diagram illustrating a schematic configuration of a data collection system including an operational amplifier according to an embodiment.

FIG. 2 includes diagrams illustrating configurations of processed data and transmission-processed data generated in an operational amplifier according to an embodiment.

FIG. 3 is a diagram illustrating a flow of processing for building a sensor network for collecting measurement data from sensors, the processing being performed between an operational amplifier and a router according to an embodiment.

FIG. 4 is a flowchart of update processing performed by an operational amplifier according to an embodiment.

FIG. 5 is a second diagram illustrating a schematic configuration of a data collection system including an operational amplifier according to an embodiment.

MODE FOR CARRYING OUT THE INVENTION

A processing apparatus of the present embodiment performs predetermined processing for measurement data transmitted from a sensor connected thereto. A predetermined physical quantity measured by the sensor can be set based on a purpose of data collection in a server apparatus. Then, the processing apparatus is configured to subject measurement data from the sensor to predetermined processing. The predetermined processing is processing for turning the measurement data from the sensor into data to be collected in the server apparatus, and examples of the predetermined processing may include amplification processing for enhancing noise immunity of data to be transmitted from the processing apparatus to the server apparatus and measurement data processing for data volume reduction or data content processing or editing. Then, data resulting from the measurement data from the sensor being subjected to the predetermined processing is referred to as "processed data" in the present application. Note that a single sensor or a plurality of sensors may be connected to the processing apparatus.

Here, in the processing apparatus, in a state before building of a network between the processing apparatus and the server apparatus, when a relay apparatus is communicatively connected to a communication unit, transmission destination information is acquired from the relay apparatus by an acquisition unit. The "state before building of a network" here means a state in which a communication network that enables transmission of processed data from the processing apparatus to the server apparatus and collection of the processed data in the server apparatus is not yet configured. Therefore, in a "state before building of a network", data collection cannot be enabled unless such communication network is built between the processing apparatus and the server apparatus. In such "state before building of a network", the transmission destination information acquired by the acquisition unit is information indicating a predetermined area in the server apparatus in which the processed data is to be stored. The predetermined area may preferably be a secure area that is inaccessible from a third party, and in such case, the transmission destination information may include information for allowing access to the predetermined area (for example, password information). In the description of the present application, the server apparatus may be configured by one or more server apparatuses. Also, the predetermined area may be a part or an entirety of a storage area in the server apparatus, and the number of areas is not necessarily limited to one.

The acquisition unit is configured to acquire the transmission destination information from the relay apparatus connected to the communication unit. Such configuration allows the processing apparatus to acquire the transmission destination information, with a communicative connection between the processing apparatus and the relay apparatus as a trigger. Preferably, the acquisition unit acquires the transmission destination information when the relay apparatus is communicatively connected to the communication unit for a first time. The acquisition of the transmission destination information by the acquisition unit enables the processing apparatus to recognize a location to which the processed data is to be transmitted, that is, the predetermined area in the server apparatus in which the processed data is to be collected.

Therefore, after the acquisition of the transmission destination information, generation of transmission-processed data is performed by the generation unit. The transmission-processed data is the processed data with information added thereto, the information relating to the predetermined area indicated by the transmission destination information, that is, being information of the location in which the processed data is to be stored, the transmission-processed data being data configured to, upon reception of the transmission-processed data by the relay apparatus, enable the relay apparatus to understand where to relay the processed data included in the transmission-processed data and thus enable the relay apparatus to execute relay processing. Note that where a plurality of sensors are connected to the processing apparatus, processed data for the respective sensors may be generated by performing the above-described predetermined processing for respective measurement data transmitted from the plurality of sensors. In such case, the generation unit only needs to generate the transmission-processed data in a form in which respective linkages between the processed data and the plurality of sensors are understandable and the relay apparatus is able to perform relay processing. Then, the generated transmission-processed data is output to the relay apparatus by an output unit. As described above, the relay apparatus can understand where to transmit the processed data included in the transmission-processed data, and thus, can enable favorable relay processing for the transmission-processed data.

Because of the processing apparatus including the acquisition unit, the generation unit and the output unit in this way, transmission destination information is acquired, with a communicative connection between the processing apparatus and the relay apparatus as a trigger. Then, the acquisition of the transmission destination information enables generation of transmission-processed data by the generation unit, and output of the transmission-processed data to the relay apparatus by the output unit is performed. As a result, with the acquisition of the transmission destination information as a trigger, a sensor network for the processing apparatus, from the processing apparatus to a predetermined area in the server apparatus via the relay apparatus, is formed. Therefore, no load other than the communicative connection of the relay apparatus to the processing apparatus is imposed on a user as a load for building the sensor network, enabling the sensor network to be built quite easily.

Specific embodiments of the present invention will be described below with reference to the drawings. Dimensions, materials, shapes, relative dispositions, etc., of the components described in the present embodiment are not intended to limit the technical scope of the invention thereto unless specifically described otherwise.

First Embodiment

An overall configuration of a system for collection of measurement data of measurement by a sensor according to a first embodiment will be described with reference to FIG. 1. The data collection system is a system for collecting measurement values from a plurality of sensors, and includes: one or more sensors 10 each configured to measure a predetermined physical quantity; an operational amplifier 20 configured to perform predetermined processing for outputs (measurement data) of the sensors 10; a server apparatus 50 that stores output data from the operational amplifier 20; and a router 30 that functions as a relay apparatus that performs relay processing for relaying data between the operational amplifier 20 and the server apparatus 50. Note that in the data collection system of the present embodiment, only one operational amplifier is illustrated but a plurality of operational amplifiers 20 may be included in the system. Also, one router 30 does not necessarily need to be connected to one operational amplifier 20, but one router 30 may be connected to a plurality of operational amplifiers 20.

Here, the sensors 10 are connected to respective input/output ports of the operational amplifier 20 wirelessly or via wires, and the operational amplifier 20 and the router 30 is also connected via wirelessly or via a wire. Also, the router 30 and the server apparatus 50 are communicatively connected through a non-illustrated base station via a wide area network such as the Internet or a LAN. Note that the network is not limited to a single network but a network of any form may be used as long as such network enables transmission and reception of measurement data by the sensors 10.

Here, each sensor 10 is a device that detects and outputs a physical quantity that is a target of sensing and a change in the physical quantity. Typical examples of the sensors 10 can include, e.g., a position sensor, a temperature sensor, a humidity sensor, an illuminance sensor, a pressure sensor, a load sensor, a sound sensor, an infrared sensor, an attitude sensor, a rainfall sensor, a radiation sensor, a gas sensor, an acceleration sensor, a gyroscope and a GPS sensor. Also, since devices such as a mobile phone, a smartphone, a tablet terminal, a mobile PC and a drone incorporate various types of sensors and thus these devices can be treated as sensors. Also, many sensors are already installed everywhere in the society for various uses and purposes such as FA and/or production management in a factory, urban traffic control, environmental measurement for, e.g., weather, healthcare and crime prevention, and these sensors can be connected to the present system. Note that a plurality of types of sensors may be mixed. As an example, in the mode illustrated in FIG. 1, a plurality of sensors 10 that are disposed at respective parts of a predetermined mechanical facility 100 and that measure respective physical quantities of the parts are connected to the operational amplifier 20.

Also, the operational amplifier 20 is a computer that communicates with the one or more sensors 10 wirelessly or via wires and that performs, e.g., management of the sensors 10 and acquisition of measurement values from the sensors 10. The operational amplifier 20 can be configured by a general-purpose computer including, e.g., a CPU (processor), a memory, an auxiliary memory (e.g., an HDD), a communication device, an input device and a display device. Various functions of the operational amplifier 20 are implemented by execution of necessary programs by the CPU. More specifically, the operational amplifier 20 includes functional units that are a data receiving unit 21, a processing unit 22, a communication unit 23, an acquisition unit 24, a generation unit 25, an output unit 26, a memory unit 27 and an update unit 28. The operational amplifier 20 may include functional units other than these functional units.

The data receiving unit 21 is a functional unit that receives measurement data of measurement by the respective sensors 10 connected to the operational amplifier 20. The measurement data received by the data receiving unit 21 are quite simply data output from the sensors 10. The data receiving unit 21 receives measurement data in a state in which the received measurement data is distinguishable as to which sensor 10 made the measurement. Then, in the operational amplifier 20, predetermined processing for the received measurement data is performed by the processing unit 22. The processing unit 22 is a functional unit that subjects the measurement data from the sensors 10 to predetermined processing (for example, signal processing such as denoising, amplification processing for S/N enhancement, arithmetic operation such as averaging processing, sampling, data compression, time stamping, etc.). A content of the predetermined processing is appropriately set in consideration of, e.g., a purpose of data collection by the server apparatus 30. Also, the processing unit 22 may execute a function that generates data in a common format based on the measurement data from the sensors 10.

Here, the measurement data subjected to the predetermined processing by the processing unit 22 is referred to as "processed data" and an example of the processed data is illustrated in upper table (a) of FIG. 2. In order to identify a sensor 10 that has provided measurement data that is a base for processed data, the processed data includes a "sensor ID" field for identifying the sensor. Furthermore, the processed data includes an "amplifier ID" field for identifying an operational amplifier configured to perform the predetermined processing, a "measurement time and date" field indicating a time and a date of measurement by the sensor, a "sensor type" field indicating a type of the measurement data and a "processed measurement value" field storing measurement values after being subjected to the predetermined processing. For the predetermined processing, a plurality of types of processing such as amplification processing and averaging processing may be employed.

The communication unit 23 is a communication interface for communicatively connecting the operational amplifier 20 to the router 30. Next, the acquisition unit 24 is a functional unit that, in a state before building of a network between the operational amplifier 20 and the server apparatus 50 for data collection, acquires information indicating a predetermined area in the server apparatus 50 in which the processed data are to be collected and stored, that is, transmission destination information used when the processed data from the operational amplifier 20 is transmitted to the server apparatus 50. When the router 30 is communicatively connected to the communication unit 23, the acquisition unit 24 acquires the transmission destination information from the router 30.

Then, the generation unit 25 is a functional unit that generates transmission-processed data, which is data for transmission to the server apparatus 50, by, after the acquisition of the transmission destination information by the acquisition unit 24, adding information indicated by the transmission destination information, the information relating to the predetermined area in the server apparatus 50 (hereinafter referred to as "added information"), to the processed data. The added information is information that enables the processed data to be delivered to the predetermined area in the server apparatus 50 by the router 30 performing relay processing, and the added information may quite simply be the transmission destination information or may be partial information included in the transmission destination information or new information generated from the transmission destination information. Here, an example of the transmission-processed data is illustrated in lower table (b) of FIG. 2. The transmission-processed data may include a "transmission destination" field that stores the added information in addition to the processed data illustrated in upper table (a) of FIG. 2. The router 30 that has received the transmission-processed data can relay the transmission-processed data to the server apparatus 50, using the information in the "transmission destination" field in that data. Then, the transmission-processed data generated by the generation unit 25 is output to the router 30 via the communication unit 23 by the output unit 26.

Also, the memory unit 27 includes a main memory and an auxiliary memory. The auxiliary memory is a device in which programs to be executed by functional units such as the processing unit 22, the acquisition unit 24, the generation unit 25 and the update unit 28 and data to be used by the programs are stored. In the auxiliary memory, the programs to be executed by the functional units being packaged as applications may be stored. Also, an operating system for executing these applications may be stored. The main memory is a memory onto which the programs executed by the functional units and data used by the programs are loaded. Also, in the main memory, the measurement data received by the data receiving unit 21 and the transmission destination information acquired by the acquisition unit 24 may be stored. The main memory may include a random access memory (RAM) and a read only memory (ROM). Also, the auxiliary memory may include an erasable programmable ROM (EPROM) and a hard disk drive (HDD). Furthermore, the auxiliary memory may include a removable medium, that is, a removable recording medium. For the removable medium, for example, a universal serial bus (USB) memory, or a disk recording medium such as a compact disc (CD) or a digital versatile disc (DVD) can be employed.

Also, the update unit 28 is a functional unit that updates the transmission destination information acquired by the acquisition unit 24. Update of the transmission destination information by the update unit 28 can appropriately be performed based on, e.g., an instruction received from the router 30 that performs relay processing of the transmission-processed data or an instruction input by a user via a non-illustrated input unit included in the operational amplifier 20.

Next, the router 30 will be described. The router 30 is a computer that performs relay processing between the operational amplifier 20 and the server apparatus 50. The router 30 can be configured by a general-purpose computer including, e.g., a CPU (processor), a memory, an auxiliary memory (e.g., an HDD), a communication device, an input device and a display device. Various functions of the router 30 are implemented by execution of necessary programs by the CPU. More specifically, the router 30 include functional units that are a communication unit 31, a memory unit 32, a matching unit 33 and a transmission control unit 34.

The communication unit 31 is a communication interface for communicatively connecting the router 30 to the operational amplifier 20 and the server apparatus 50. The memory unit 32 includes a main memory and an auxiliary memory and is substantially similar to the above-described memory unit 27, and thus, detailed description thereof will be omitted. In the memory unit 32, the above transmission destination information, and information for identifying the operational amplifier 20, which is a target to which the transmission destination information is to be delivered are also stored. The matching unit 33 is a functional unit that when the operational amplifier 20 and the router 30 are connected in such a manner as to be communicative with each other in a state before building of a network between the operational amplifier 20 and the server apparatus 50 for data collection, performs matching to determine whether or not the operational amplifier 20 is authorized to acquire the transmission destination information, in order for the acquisition unit 24 to acquire the transmission destination information from the router 30, with the connection as a trigger.

More specifically, the matching unit 33 performs matching between the information for identifying the operational amplifier 20, which is stored in the memory unit 32, and identification information sent from the actually connected operational amplifier 20. Then, the transmission control unit 34 is a functional unit that performs processing for relaying the transmission-processed data sent from the operational amplifier 20 to the server apparatus 50, and more specifically, the transmission control unit 34 relays the transmission-processed data to the server apparatus 50 via the communication unit 31, using information in the "transmission destination" field in the transmission-processed data.

Next, the server apparatus 50 will be described. The server apparatus 50 is a server apparatus that accumulates data from the respective sensors 10, the data being output from the operational amplifier 20 and relayed by the router 30. The server apparatus 50 can also be configured by a general-purpose computer including, e.g., a CPU (processor), a memory, an auxiliary memory (e.g., an HDD), a communication device, an input device and a display device. Various functions of the server apparatus 50 are implemented by execution of programs by the CPU. More specifically, the server apparatus 50 includes functional units that are a communication unit 51, a memory unit 52 and a control unit 53.

The server apparatus 50 is configured by a general computer. In other words, the server apparatus 50 is a computer including, e.g., a processor such as a CPU or a GPU, a main memory such as a RAM and a ROM and an auxiliary memory such as an EPROM, a hard disk drive and a removable medium. Note that the removable medium may be, for example, a USB memory or a disk recording medium such as a CD or a DVD. In the auxiliary memory, an operating system (OS), various programs, various tables, etc., are stored, and functions serving a predetermined purpose can be implemented by the stored programs being loaded onto a work area of the main memory and executed and respective component units and the like being controlled through the execution of the programs. However, some or all of the functions may be implemented by a hardware circuit such as an ASIC or an FPGA. Note that the server apparatus 50 may be configured by a single computer or may be configured by a plurality of computers that cooperate with each other.

The communication unit 51 is a communication interface for connecting the server apparatus 50 to a network. The memory unit 52 is a device including a main memory and an auxiliary memory, and stores programs to be executed by the control unit 53 and data to be used by the programs. The memory unit 52 includes a database that accumulates the transmission-processed data received via relay processing by the router 30. The database is built by a program of a database management system (DBMS) executed by the control unit 53 managing data stored in the memory unit 52. The database used in the present embodiment is, for example, a relational database. The control unit 53 is an arithmetic device that manages control performed by the server apparatus 50. The control unit 53 can be implemented by an arithmetic processing apparatus such as a CPU.

Here, processing performed between the operational amplifier 20 and the router 30 for building the information processing system illustrated in FIG. 1 will be described with reference to FIG. 3. Note that in S101 and S102 in FIG. 3, no communicative connection is established between the operational amplifier 20 and the router 30 and each of these apparatuses is in an independent state. First, in S101, each sensor 10 is connected to the operational amplifier 20. With the connection as a trigger, in S102, identification processing for identifying whether or not the connected sensor 10 is a sensor that allows data collection by the operational amplifier 20 is performed. The identification processing is performed by the data receiving unit 21, and more specifically, the identification processing is performed based on, e.g., identification information of the connected sensor 10, the identification information being obtained from the sensor 10. As a result of the identification processing, if the connected sensor 10 is an applicable sensor, the data receiving unit 21 becomes able to receive measurement data from the sensor 10; however, in reality, the data receiving unit 21 is kept waiting for reception of measurement data until later-described processing in S109 to S111 is completed. Note that as another method, upon the data receiving unit 21 becoming able to receive measurement data from the sensor 10, the measurement data may be temporarily stored in the memory unit 27 of the operational amplifier 20 and processing in S103 to S111 may be performed in parallel with the storage. On the other hand, if the connected sensor 10 is not an applicable sensor, a notice to the effect that the sensor 10 is non-conforming is provided to a user via a non-illustrated notification unit of the operational amplifier 20.

Then, upon the communication unit 31 of the router 30 being connected to the communication unit 23 of the operational amplifier 20 to which the sensors 10 are connected, in each of the operational amplifier 20 and the router 30, processing for recognizing the connection with the other is performed. A connection state in which the operational amplifier 20 and the router 30 are connected is, for example, a state in which the communication unit 23 and the communication unit 31 are connected via a wire and both apparatuses are powered on. Then, with formation of such connection state as a trigger, in the operational amplifier 20, the connection with the router 30 is recognized in S103, and in the router 30, the connection with the operational amplifier 20 is recognized in S104. Note that at this point of time, network for data collection has not yet been built between the operational amplifier 20 and the server apparatus 50, and the operational amplifier 20 is unable to transmit measurement data delivered from the sensors 10 to the outside. Upon completion of the processing in S103 and S104, the operational amplifier 20 and the router 30 enter a state of being communicatively connected.

Then, upon formation of the state of communicative connection between both apparatuses, a signal for requesting identification information of the operational amplifier 20 is provided from the router 30 to the operational amplifier 20 (processing in S105). Then, upon reception of the request signal, the operational amplifier 20 transmits identification information of its own to the router 30 (processing in S106). Subsequently, in processing in S107, the matching unit 33 of the router 30 performs processing for matching between the identification information received from the operational amplifier 20 and identification information for identifying an operational amplifier that is a target for which relay processing is to be provided by the router 30, the identification information being stored in the memory unit 32 in advance. A purpose of the matching processing is to determine whether or not the operational amplifier 20 communicatively connected to the router 30 is authorized to acquire transmission destination information, which is information relating to a transmission destination in the relay processing by the router 30. Then, as a result of the matching processing in S107, if it is determined that the connected operational amplifier 20 is authorized, the transmission destination information stored in the memory unit 32 (in the case of the present embodiment, information indicating a predetermined storage area for data collection from the operational amplifier 20, the predetermined storage area being set in the memory unit 52 of the server apparatus 50 in advance) is transmitted from the router 30 to the operational amplifier 20 (processing in S108).

As a result, in the processing in S109, the acquisition unit 24 of the operational amplifier 20 acquires the transmission destination information from the router 30. The acquired transmission destination information is stored in the memory unit 27. Upon the acquisition of the transmission destination information, the operational amplifier 20 grasps a transmission destination for collecting information pieces relating to measurement data from the sensors 10, that is, the processed data illustrated in upper table (a) of FIG. 2. This means that it has become possible to substantially form a network for delivering processed data to the server apparatus 50 via relay processing by the router 30, between the operational amplifier 20 and the server apparatus 50. Therefore, in subsequent processing in S110, a permission for data measurement by the sensors 10 and a permission for the predetermined processing of measurement data delivered from the sensors 10 to the operational amplifier 20 are given. Consequently, in the operational amplifier 20, the predetermined processing by the processing unit 22 is executed, whereby the processed data indicated in upper table (a) of FIG. 2 are generated.

Then, transmission-processed data are generated by the generation unit 25 based on the processed data generated through the predetermined processing by the processing unit 22 (processing in S111). As illustrated in lower table (b) of FIG. 2, the transmission-processed data are data resulting from information indicating the transmission destination of the processed data being added to the processed data. Subsequently, in processing in S112, the generated transmission-processed data are output to the router 30 by the output unit 26. Then, in the router 30 that has received the transmission-processed data, relay processing to the transmission destination included in the transmission-processed data, that is, the predetermined storage area in the memory unit 52 of the server apparatus 50 is performed by the transmission control unit 34 (processing in S113).

In the processing illustrated in FIG. 3, after the acquisition of the transmission destination information from the router 30 by the operational amplifier 20, in the operational amplifier 20, the transmission-processed data are generated based on the measurement data of measurements successively made by the sensors 10 and output to the router 30. As a result, the transmission-processed data are collected in the server apparatus 50. In particular, according to the processing sequence in S103 to S112, with a first communicative connection of the router 30 to the operational amplifier 20 as a trigger, a network for collecting measurement data of measurements by the sensors 10 is built and the processing sequence is automatically performed between the operational amplifier 20 and the router 30, and thus, the network is built easily.

Next, processing for update of the transmission destination information will be described with reference to FIG. 4. As above, when the operational amplifier 20 and the router 30 are communicatively connected for a first time, the operational amplifier 20 acquires the transmission destination information from the router 30; however, there are cases where the transmission destination information needs to be updated. Examples of such cases can include, e.g., a case where a data collection transmission destination is permanently changed from the server apparatus 50 to another server apparatus and a case where a data collection transmission destination is temporarily changed to another server apparatus because of, e.g., maintenance of the server apparatus 50.

Therefore, in the update processing, first, in S201, whether or not a change instruction to change the transmission destination information already acquired by the acquisition unit 24 and stored in the memory unit 27 is received is determined. The change instruction may be received from the server apparatus 50 via the router 30 or may be input by a user via the non-illustrated input unit included in the operational amplifier 20. If an affirmative determination is made in S201, the processing proceeds to S202, and if a negative determination is made, the update processing ends.

Subsequently, in S202, update of the transmission destination information is performed by the update unit 28. Note that new transmission destination information may be transmitted from the server apparatus 50 to the operational amplifier 20 or input by a user, together with the change instruction. The updated transmission destination information is stored in the memory unit 27. Upon an end of the processing in S202, the processing proceeds to S203.

In S203, whether or not there is un-output data that is transmission-processed data already generated by the generation unit 25 but is still present in the operational amplifier 20 without being output by the output unit 26 to the router 30 at this point of time is determined. Since such un-output data is data with the updated transmission destination information reflected therein, if the un-output data is output to the router 30 as it is, the data may fail to be properly collected. Therefore, if affirmative determination is made in S203, that is, if such un-output data remains in the operational amplifier 20, processing in S204 is performed. In S204, information in the "transmission destination" field included in the already generated transmission-processed data is modified to information with the updated transmission destination information reflected therein. Note that if negative determination is made in S203, the processing in S204 is not performed.

Then, after the processing in S204 or after negative determination being made in S203, in S205, transmission-processed data is generated by the generation unit 25 according to the updated transmission destination information.

The update processing illustrated in FIG. 4 being executed in this way enables measurement information pieces from the sensors 10 to be collected in a favorably manner according to the updated transmission destination information.

Second Embodiment

An overall configuration of a measurement data collection system according to a second embodiment will be described with reference to FIG. 5. Note that from among the components of the collection system illustrated in FIG. 5, components that are substantially identical to the components of the collection system illustrated in FIG. 1 are provided with reference numerals that are identical to those of components of the collection system illustrated in FIG. 1, and detailed description thereof are omitted. In the collection system illustrated in FIG. 5, a control apparatus 40 is interposed between an operational amplifier 20 and a router 30 and a plurality of operational amplifiers 20 are communicatively connected to the control apparatus 40.

The control apparatus 40 can be configured by a general-purpose computer including, e.g., a CPU (processor), a memory, an auxiliary memory (e.g., an HDD), a communication device, an input device and a display device, and includes functional units that are a communication unit 41, a memory unit 42 and a control unit 43. Note that the communication unit 41 is a communication interface for communicatively connecting the router 30 and the respective operational amplifiers 20. The memory unit 42 includes a main memory and an auxiliary memory and is substantially similar to the memory unit 27 and the memory unit 32 described above, and thus, detailed description thereof is omitted. The memory unit 42 temporarily stores transmission-processed data output by output units 26 of the respective operational amplifiers 20. The control unit 43 transmits the transmission-processed data temporarily stored in the memory unit 42 to the router 30 via the communication unit 41 according to a predetermined transmission timing. The predetermined transmission timing may be a timing determined in advance or, as another method, may be a timing of transmission permission given from the router 30 side. The control apparatus 40 being interposed in this way enables smoothly collecting transmission-processed data in the server apparatus 50 while avoiding shortage of storage capacity of the memory unit 27 due to accumulation of transmission-processed data in the operational amplifier 20.

DESCRIPTION OF THE REFERENCE NUMERALS AND SYMBOLS

10 . . . sensor, 20 . . . operational amplifier, 30 . . . router, 40 . . . control apparatus, 50 . . . server apparatus, 100 . . . mechanical facility

The invention claimed is:

1. A processing apparatus connected to a sensor configured to measure a predetermined physical quantity, the processing apparatus performing predetermined processing for measurement data transmitted from the sensor, the processing apparatus comprising:
   a communication unit that performs communication between an outside and the processing apparatus;
   an acquisition unit that acquires transmission destination information indicating a predetermined area in a server apparatus in the outside in which processed data subjected to the predetermined processing is to be stored, from a relay apparatus that performs relay processing between the processing apparatus and the server apparatus in order to transmit the processed data from the processing apparatus to the server apparatus, when the relay apparatus is communicatively connected to the communication unit in a state before building of a network between the processing apparatus and the server apparatus;
   a generation unit that generates, after the acquisition of the transmission destination information, transmission-processed data in a form in which the relay apparatus is able to execute the relay processing, by adding information relating to the predetermined area indicated by the transmission destination information to the processed data; and
   an output unit that outputs the transmission-processed data to the relay apparatus.

2. The processing apparatus according to claim 1, wherein:
   the relay apparatus has target identification information for identifying a target processing apparatus for which the relay processing is to be provided; and
   when the processing apparatus is connected to the relay apparatus via the communication unit, if it is determined that the processing apparatus is the target processing apparatus, as a result of matching between identification information of the processing apparatus and the target identification information that the relay apparatus has being performed in the relay apparatus, the acquisition unit acquires the transmission destination information from the relay apparatus.

3. The processing apparatus according to claim 1, wherein:
the acquisition unit acquires the transmission destination information from the relay apparatus when the relay apparatus is communicatively connected to the communication unit for a first time; and
after the acquisition of the transmission destination information, the predetermined processing for the measurement data transmitted from the sensor is permitted.

4. The processing apparatus according to claim 1, wherein:
the processing apparatus are connected to a plurality of the sensors and generates the respective processed data for the plurality of the sensors by performing the predetermined processing for the respective measurement data transmitted from the plurality of the sensors; and
the generation unit generates the transmission-processed data in the form in which respective linkages between the processed data and the plurality of sensors are understandable and the relay apparatus is able to execute the relay processing.

5. The processing apparatus according to claim 1, wherein:
upon the processing apparatus acquiring a change instruction to change a transmission destination of the processed data to a new transmission destination, the already acquired transmission destination information is updated to new transmission destination information relating to the new transmission destination, based on the change instruction; and
the generation unit generates new transmission-processed data for the processed data based on the new transmission destination information so that the relay apparatus is able to execute relay processing between the processing apparatus and the new transmission destination.

6. A processed data collection method for collecting processed data subjected to predetermined processing for measurement data transmitted from a sensor in a processing apparatus connected to the sensor, the sensor being configured to measure a predetermined physical quantity, the processed data collection method comprising:

acquiring transmission destination information indicating a predetermined area in a server apparatus on a network in which the processed data is to be stored, from a relay apparatus that performs relay processing between the processing apparatus and the server apparatus in order to transmit the processed data from the processing apparatus to the server apparatus, when the relay apparatus is communicatively connected to a communication unit included in the processing apparatus;
generating, after the acquisition of the transmission destination information, transmission-processed data in a form in which the relay apparatus is able to execute the relay processing, by adding information relating to the predetermined area indicated by the transmission destination information to the processed data; and
outputting the transmission-processed data to the relay apparatus.

7. A data collection system comprising:
a processing apparatus connected to a sensor configured to measure a predetermined physical quantity, the processing apparatus performing predetermined processing for measurement data transmitted from the sensor;
a server apparatus on a network; and
a relay apparatus that performs relay processing between the processing apparatus and the server apparatus in order to transmit processed data subjected to the predetermined processing from the processing apparatus to the server apparatus, wherein
the processing apparatus includes
a communication unit that performs communication between an outside and the processing apparatus,
an acquisition unit that acquires transmission destination information indicating a predetermined area in the server apparatus in which the processed data is to be stored, from the relay apparatus, when the relay apparatus is communicatively connected to the communication unit,
a generation unit that generates, after the acquisition of the transmission destination information, transmission-processed data in a form in which the relay apparatus is able to execute the relay processing, by adding information relating to the predetermined area indicated by the transmission destination information to the processed data, and
an output unit that outputs the transmission-processed data to the relay apparatus.

* * * * *